INVENTOR
Harry T. Kelsh.
BY Albert J. Kramer
ATTORNEY

Dec. 20, 1955  H. T. KELSH  2,727,432
COMPENSATING MEANS FOR PHOTOGRAMMETRIC INSTRUMENTS
Filed May 11, 1954  5 Sheets-Sheet 4

INVENTOR
Harry T. Kelsh.

BY Albert J. Kramer
ATTORNEY

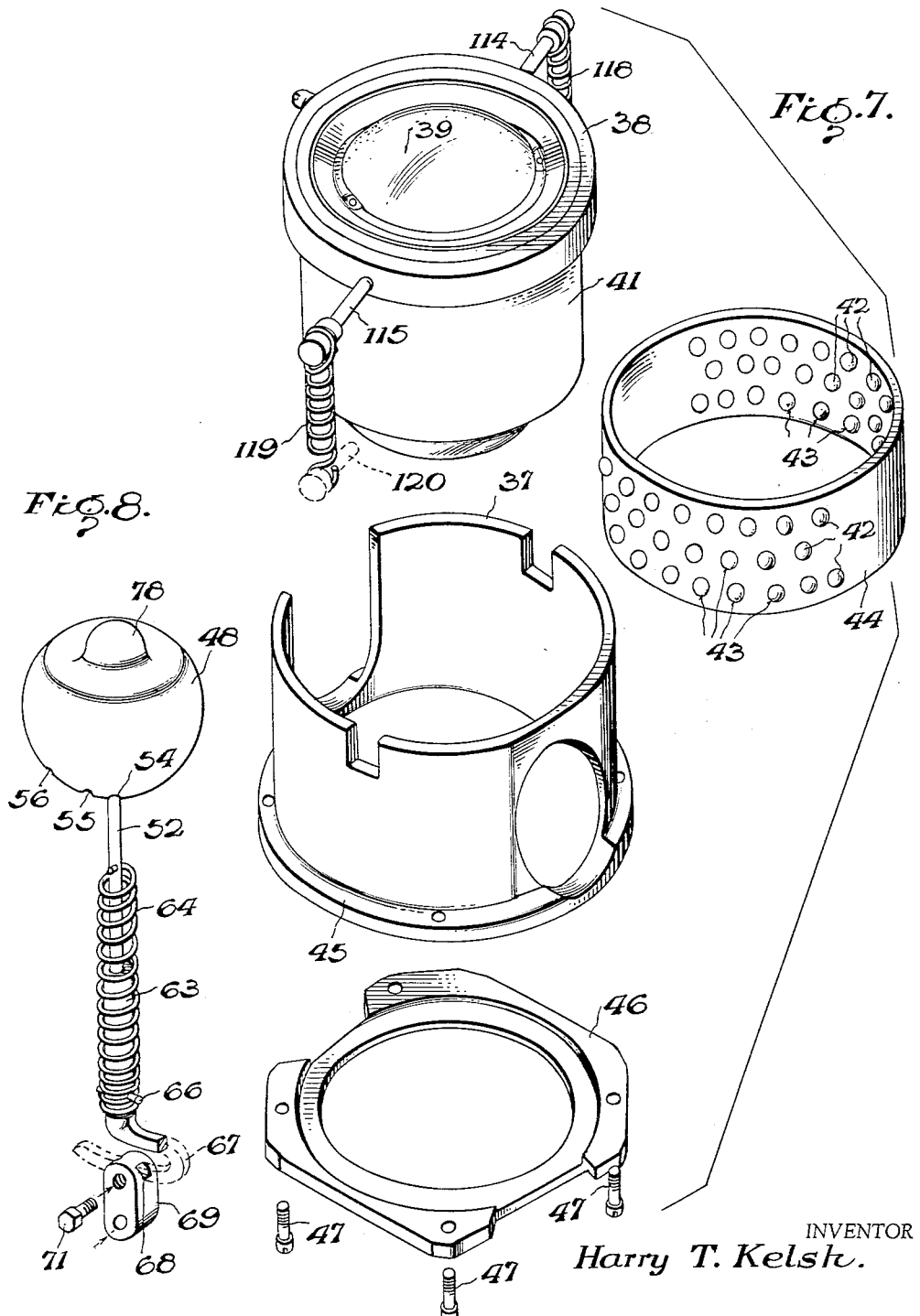

United States Patent Office 2,727,432
Patented Dec. 20, 1955

2,727,432

COMPENSATING MEANS FOR PHOTOGRAMMETRIC INSTRUMENTS

Harry T. Kelsh, Washington, D. C., assignor to The Kelsh Instrument Company, Inc., Baltimore, Md., a corporation of Maryland Application May 11, 1954, Serial No. 428,931

8 Claims. (Cl. 88—24)

This invention relates to photogrammetric instruments and is more particularly concerned with devices for use in connection with instruments of the type described in my prior Patents Nos. 2,451,031, 2,492,870 and 2,552,975.

In my Patent No. 2,552,975, I have described means in a projection unit of a photogrammetric projection instrument for correcting or compensating for errors due to radial distortion and comprising, generally, a projection lens mounted in the unit for vertical movement, a linkage system connecting a movable light beam projector of the instrument to the lens, the linkage system including a ball cam, a socket for tiltably supporting the cam, links connecting the cam to the projector, a pivoted lever connected to the lens, and a cam follower carried by the lever and slidably engaging the ball cam.

The contour of such a cam can be designed to compensate for any given set of conditions involving radial distortion, such as lens distortion, distortion due to earth's curvature, and distortion due to atmospheric refraction.

In actual practice there are instances where distortion due to one or more of such conditions is a variable factor, while distortions due to another or other factors are constant. For example, the optical systems of the camera and of the projection instrument may be the same under different photography conditions, such as flight altitudes. Radial distortions due to the effect of the earth's curvature and atmospheric refraction at different flight altitudes require different and additional compensating means, and the compensation required for each flight interval is different from those required at other flight intervals. Thus, a set of aerial photographs made at a flight altitude of, say, 40,000 feet, would contain radial distortion errors due to the earth's curvature and atmospheric refraction, different from that encountered at 20,000 feet or 60,000 feet.

Although to compensate for all or any radial distortion errors is feasible by designing a single ball cam to compensate for the algebraic sum of all the distortion errors involved or considered, a more general and flexible solution to the problem has been sought.

Accordingly, one of the objects of this invention is the provision of a plurality of coacting correction devices in projection instruments of the type mentioned, each device being designed to correct or compensate for radial distortion due to at least one factor, such as (1) the optical system of the camera, (2) the optical system of the projection instrument, (3) earth's curvature, and (4) atmospheric refraction.

The importance and need for overcoming the photographic effects of earth curvature and atmospheric refraction in photogrammetric instruments has been steadily increasing as greater accuracies and higher flight operational altitudes of cameras have been attained. For example, at altitudes of 30,000 feet and higher, the photographic effect on the vertical positions of objects along the earth's surface is quite significant and must be overcome if an accurate survey is to be made.

Such errors are significant in both vertical photographs, that is, photographs taken with the axis of the lens camera pointing straight down, and oblique or tilted photographs, that is, where the camera is pointed at an angle to the plumb line of the airplane, but is especially significant in the latter case. Oblique photography, such as 20° or 60°, is important as a means of increasing the ground area covered by each photograph, and thus reducing survey costs. Accordingly, it is an object of this invention to provide an instrument of the type mentioned which can be used for oblique or tilted photography as well as for vertical photography. In both cases earth curvature error is radial from the nadir point. However, only in the case of vertical photography is the nadir point coincident with the principal point of the photograph.

These and other objects and advantages of the invention will appear more fully from the following description considered together with the accompanying drawing.

In the drawing:

Fig. 7 is an exploded perspective view of the principal parts of the lens barrel and lens carrier.

Fig. 8 is a perspective view of the tensioned pull rod and its associated ball cam apart from the other elements of the embodiment.

Figure 1:
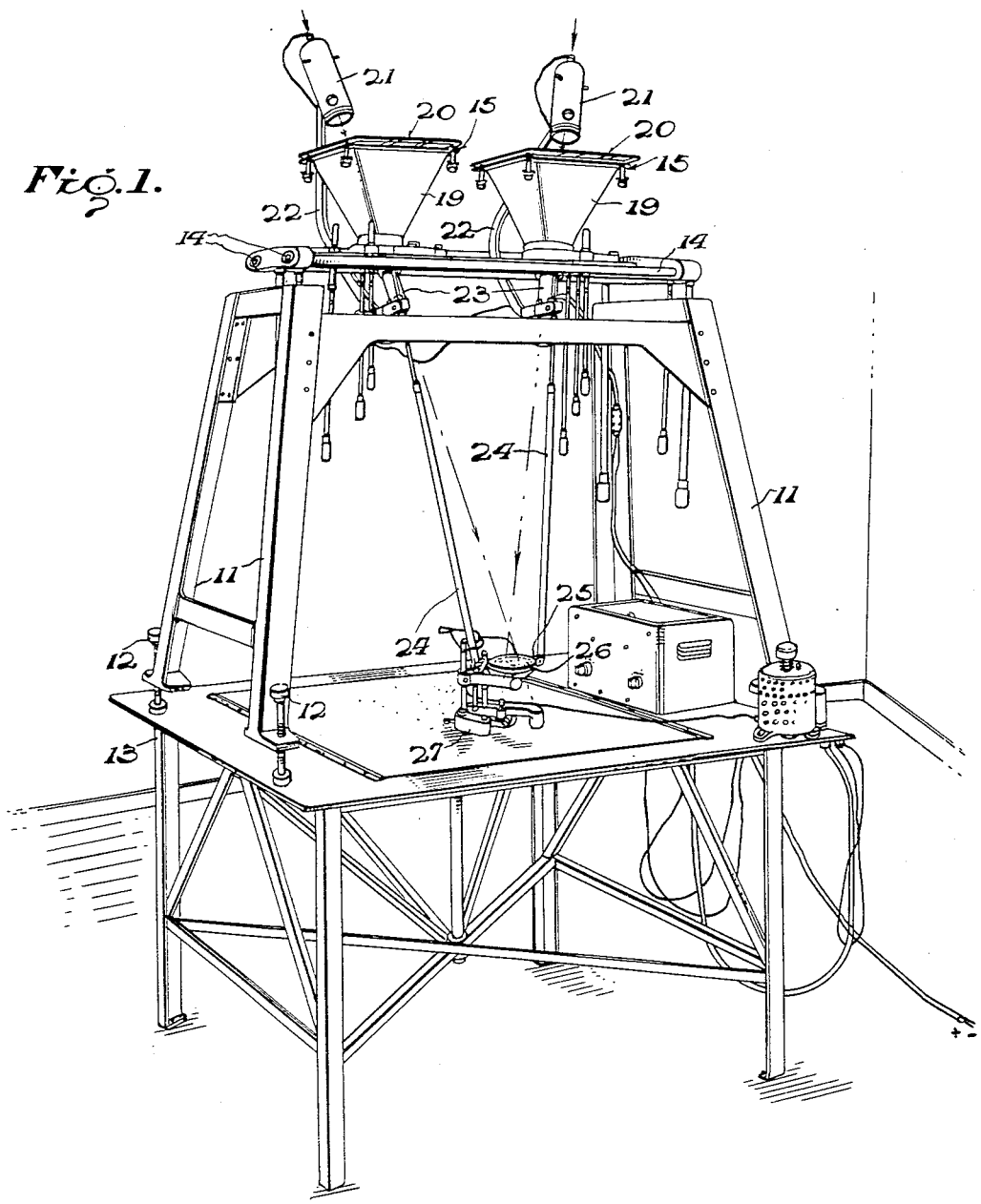
Fig. 1 is a perspective view of a stereoscopic photogrammetric instrument to which the invention is applied.
Figure 2:
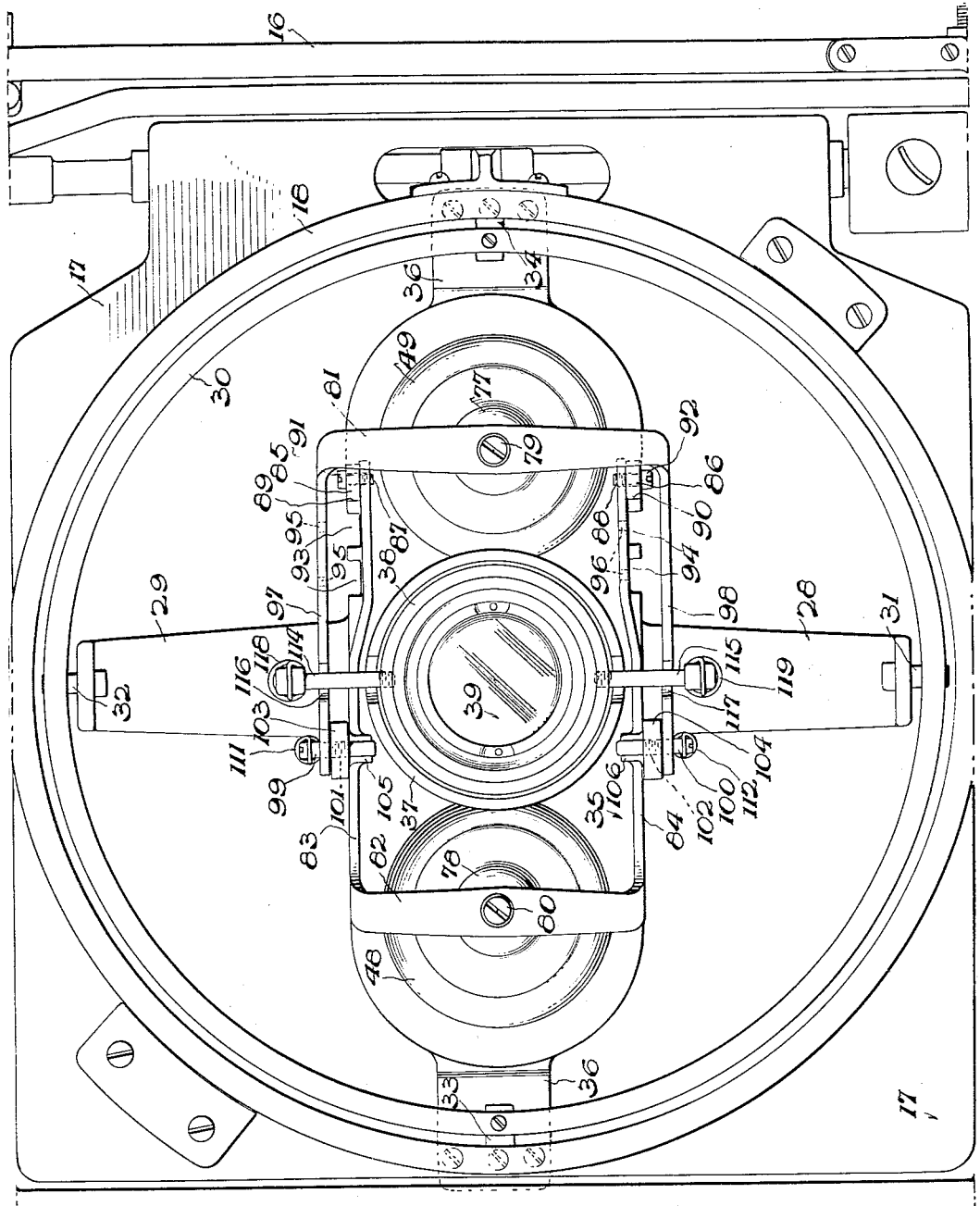
Fig. 2 is a plan view of one of the lens mounts of the instrument comprising an embodiment of the invention.
Figure 3:
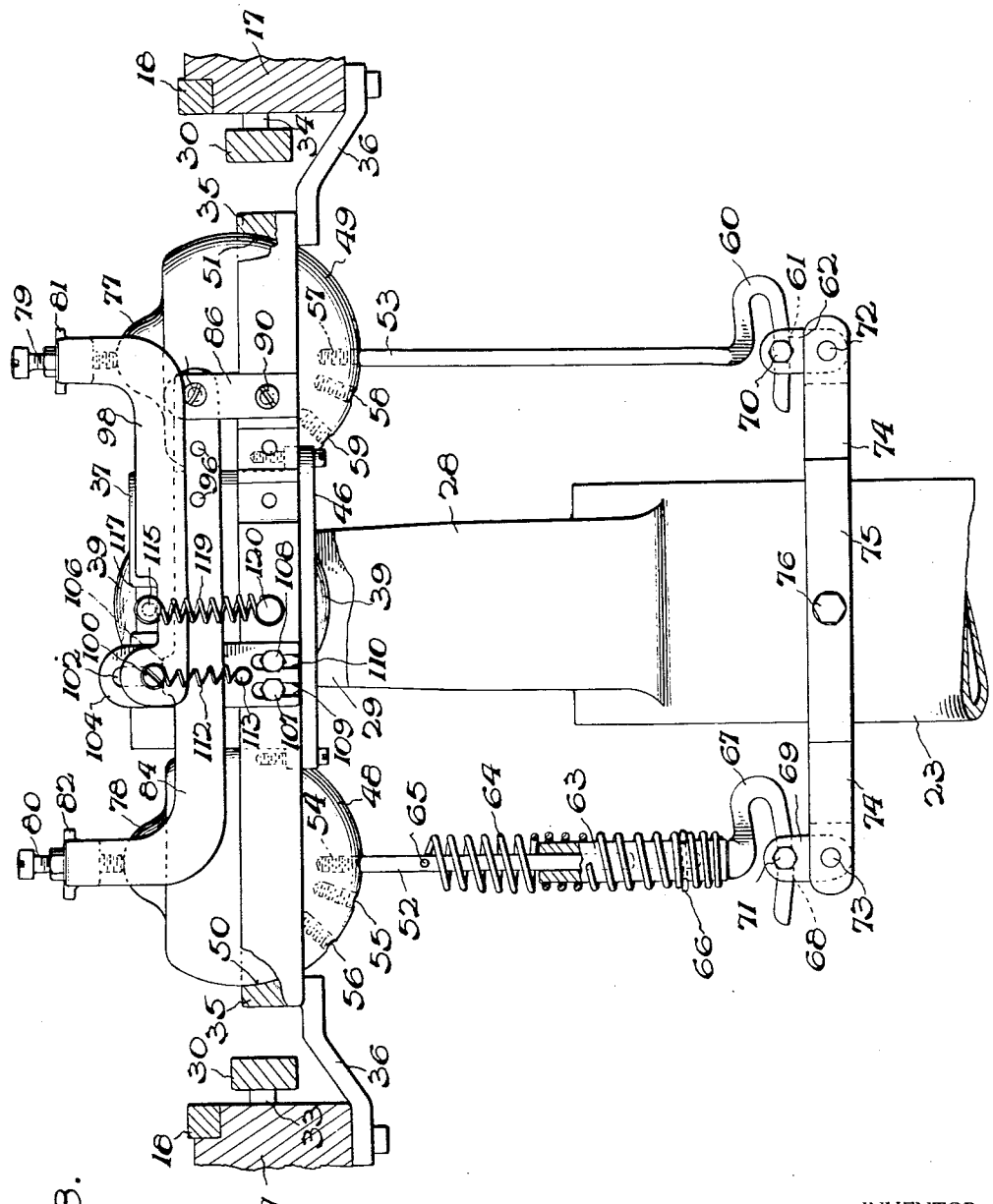
Fig. 3 is a front elevational view of the lens mount, with parts broken away.
Figure 4:
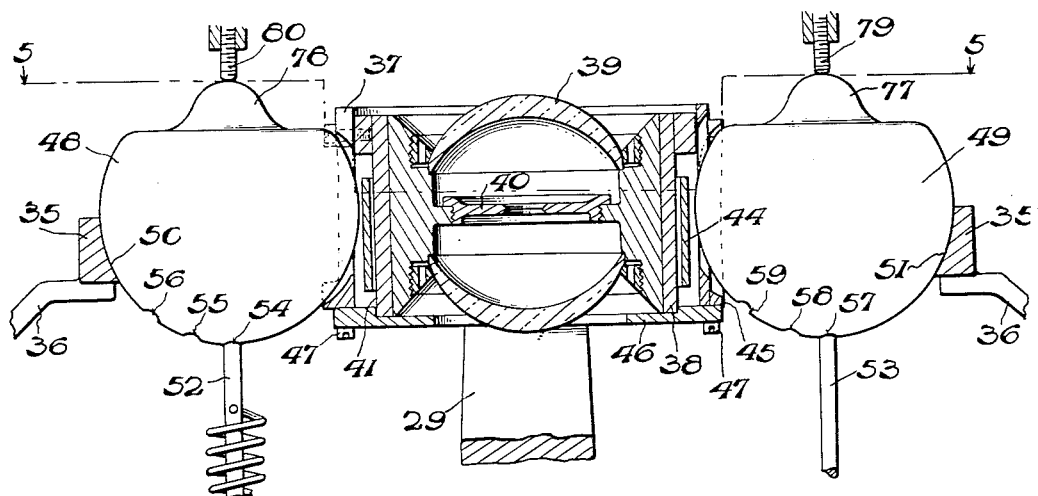
Fig. 4 is an elevational view of the ball cams and a vertical sectional view through the lens barrel showing the relative positions thereof.
Figure 5:
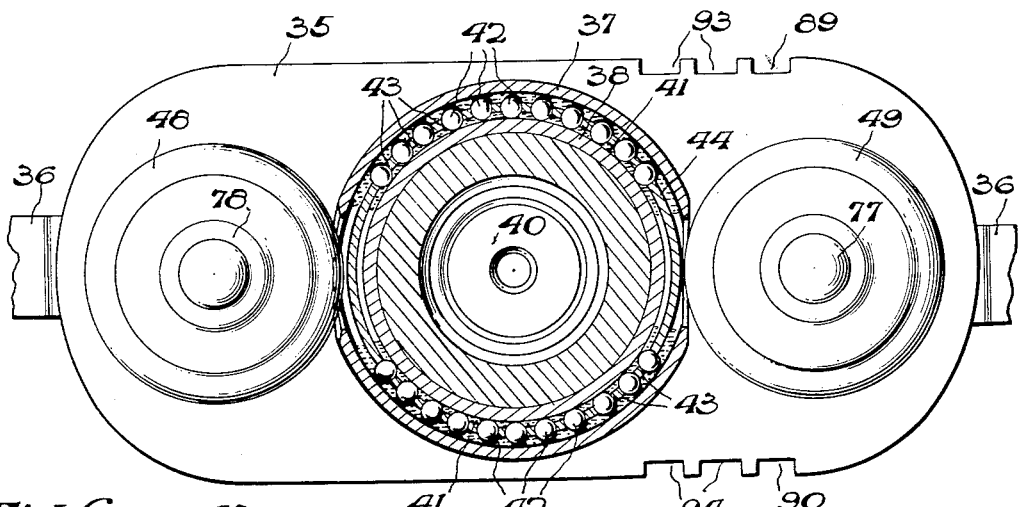
Fig. 5 is a plan sectional view along the line 5—5 of Fig. 4.
Figure 6:
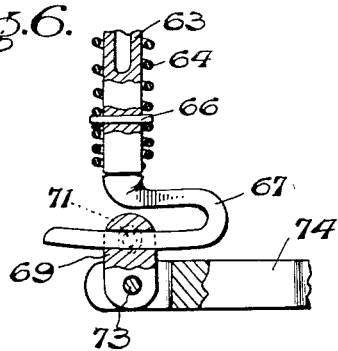
Fig. 6 is a view of a fragmentary portion of the embodiment, showing a representative means of adjustably connecting the ball cam tensioned pull rod to the rocker arm of the light tube.

Referring with more particularity to the drawing in which like numerals designate like parts, the embodiment is illustrated in connection with a stereoscopic photogrammetric instrument of the type mentioned and which comprises, in general, a suitable frame structure 11 which is mounted on adjustable legs 12, and supported on a table 13 or other suitable horizontal support. At the top of the frame 11, there are mounted tracks 14, which carry a pair of optical projection units indicated generally at 15.

Each projection unit includes a base member 16 and an inner adjustable block 17 containing an annular rotatable flange 18, which receives the lower end of a hood-like member 19 in the form of a hollow inverted truncated pyramid. The top of the member 19 is adapted to carry the diapositive 20 whose images are to be projected. A light projector 21 of a narrow cone of light rays, is movably mounted above the diapositive 20 on the upper end of a gooseneck arm 22. The lower end of the gooseneck arm extends around the member 19 and is secured beneath it to a light tube 23, axially aligned with the projector 21 and the node or nodal region of the lens of the unit hereinafter more fully described.

The member 23 is secured to the upper end of a telescopable arm 24. The lower end of arm 24 is secured by universal joint 25 to one side of the platen 26 of a tracing or mapping table 27 of the type usually employed in projection plotters. Light from the two projectors is thus maintained in a converging relationship to platen 26 to insure always a proper stereoscopic projection and limit the light projected through the diapositive 20 to about the area of the platen.

The member 23 is supported for universal movement by being secured to the lower end of yoke arms 28 and 29, the upper ends of which are pivoted to a gimbal ring 30 by means of pins 31 and 32. The gimbal ring is, in turn, pivotally supported on the block 17 by means of pins 33 and 34.

Above the member 23 is disposed a bridge member 35, the ends of which are secured to the block 17 by arms 36. The bridge 35 is provided with a central cylindrical member 37 presented as the lens barrel which is coaxially aligned with the member 23. Within the lens barrel 37, there is slidably mounted a tubular lens carrier 38 supporting a lens system 39, with which a diaphragm 40 may be included.

Portions of the exterior surface 41 of the lens carrier 38 form an inner race or rolling surface for ball bearings 42. The lens barrel 37 is in spaced relation to the surface 41 and corresponding portions thereof form an outer race or rolling surface for the ball bearings.

The ball bearings themselves are held in apertures 43 of a retainer cylinder 44 disposed between the two surfaces.

The lower edge of the lens barrel 37 carries an outwardly extending flange 45 to which a bottom retainer ring 46 is secured by screws or bolts 47 to act as a shelf to keep retainer cylinder 44 from falling out of the lens barrel.

On either side of the lens barrel there are disposed ball cams 48 and 49 which rest in annular seats or sockets 50, 51, respectively, of the bridge member 35. To the bottom of each ball cam there is secured a vertical rod 52, 53, respectively, projecting downwardly. The upper end of each of these rods is threaded to selectively engage one of a series of threaded apertures 54, 55, 56 and 57, 58, 59, respectively, at the bottom of the ball cams, the alternate use of which will be explained hereinafter more fully.

The lower end of the rod 53 carries a hook 60 which slidably engages a curved slot 61 in the upper part of a link 62. The lower end of the other rod 52 is slidably engaged with a hollow member 63 constituting together a telescopical pair which are urged together by a tensioned coil spring 64 encircling the two parts, as shown. The upper end of the spring 64 is anchored in an aperture 65 of the rod 52 and the lower end of the spring is held by a cross-pin 66 in the hollow member 63. A hook 67, similar to the hook 60, is swiveled to the bottom of the member 63, and slidably engages a curved slot 68 in a link 69, similar to the slot 61 in the link 62. The radii of curvature of slots 61 and 68 and of the engaging fingers of the hooks 60 and 67 are the same, and the center of curvature thereof is coincident with the center of rotation of the cams relative to their corresponding cam seats. The hooks are held in any given position of adjustment in the slots 61 and 68 by set screws 70 and 71.

The lower ends of the links 68 and 69 are pivotally connected with pins 72 and 73 to the outer ends of a rocker arm 74. The rocker arm 74 has a central ring portion 75 which surrounds the tubular member 23 and is pivotally connected to it by pins 76, one on either side.

By these means both ball cams are resiliently urged and held against their corresponding annular seats, and engagement and disengagement of the rods 52 and 53 with their respective ball cams can be made readily.

The top portions of the ball cams are provided with curvatures 77 and 78 designed to compensate for radial distortion of different kinds, as indicated above. For example, the curvature 77 may be designed to compensate for radial distortions of camera lenses and/or the lens system of the projection instrument itself, while the curvature 78 may be designed to compensate for radial distortion due to the earth's curvature or atmospheric refraction or both.

Associated with each of these curvatures is a cam follower 79 and 80, respectively, adjustably mounted on cross-bars 81 and 82. The bar 82 is integral with a pair of spaced arms 83 and 84 which straddle the lens barrel and extend generally parallel to and above the bridge member 35, substantially as shown. The outer ends of arms 83 and 84 are pivotally connected to the upper end of brackets 85, 86 with pins 87 and 88. The lower ends of said brackets are set in recesses 89 and 90 in the sides of the bridge member 35 and are secured thereto by screws 91 and 92.

Where the ball cam 48, for example, is to be used to correct for radial distortions due to the earth's curvature or atmospheric refraction, the amount of correction needed will vary with the altitude of the airplane from which the photographs were taken. Accordingly, in order to adjust the mechanism for different photoflight altitudes, provisions may be made to change the pivot axis of the arms 83 and 84 and, consequently, the leverage thereof. One means for doing this is illustrated in the drawing, and consists in simply providing additional recesses 93 and 94, similar to the recesses 89 and 90, in the bridge member 35 as substitute positions for the bracket members 85 and 86 and corresponding pivot holes 95 and 96 for the pivot pins 87 and 88. It is to be understood, however, that the invention is not limited to such specific adjustment means and may include any other means for changing the pivot point of these arms.

The bar 81 is integral with a pair of spaced arms 97 and 98 which also straddle the lens barrel and which extend in the direction opposite to and above the arms 83 and 84, generally parallel to the bridge 35. The outer ends of the arms 97 and 98 carry bearing pins 99 and 100 which pass through longitudinal slots 101 and 102 of brackets 103 and 104, respectively, and rest on bearing surfaces or bosses 105 and 106 of the arms 83 and 84, respectively. The brackets 103 and 104 are secured to the bridge 35 by means of bolts passing through apertures of the brackets, such as the bolts 107 and 108 in apertures 109 and 110 of the bracket 104. The apertures 109 and 110 may be in the form of vertical slots, as illustrated, to permit vertical adjustment of the brackets. The bearing pins 99 and 100 are held in constant engagement with the bosses 105 and 106 by means of springs 111 and 112, the upper ends of which are connected to the pins and the lower ends of which are anchored to the brackets 103 and 104 by means of anchor pins, such as the pin 113. Motion of the combined actions of these cam follower arms is transmitted to the lens carrier by means of fingers 114 and 115 secured to the lens carrier and projecting outwardly in contact with the top of recessed portions 116 and 117 of the arms 97 and 98. These fingers are held in constant engagement with the recessed portions by means of springs 118 and 119, the upper ends of which are attached to the fingers and the lower ends of which are anchored to the bridge 35 by means of anchor bolts, such as anchor bolt 120, or any other suitable means. These springs are also effective in urging the cam followers 79 and 80 in constant engagement with their corresponding ball cams.

In using the instrument for oblique or tilted photography, the projection units 19 are tilted inwardly in an amount corresponding to the angle of the photographs which is defined as the angle which the axis of the camera lens makes with a vertical line passing through the nadir point. To provide for mapping such photographs, it is necessary to change correspondingly the positions of the rods 52 and 53, relative to their respective ball cams. For this purpose the additional threaded apertures 55, 56 and 58, 59 are provided. For example, one of these apertures may be located for 20° oblique photography and the other for 45° photography. Still others may be provided for 30°, 60°, etc., if desired. The instrument is used in substantially the same way as that described in said Patent No. 2,552,975 except that the lens carrier will move axially in accordance with the resultant of the displacements of both cam followers effected by the two cams instead of just one.

Having thus described my invention, I claim:

1. In a photogrammetric projection apparatus, a projector unit having a diapositive support, a movable light beam projector on one side and a projector lens on the other side of said support, said lens being mounted for movement to and from said support, said unit also having a linkage system comprising a rocker arm connected to said projector and to said lens, said system including two ball cams on opposite sides of the projection axis, a socket fixed in relation to the said support for tiltably supporting each cam, links connecting said cams to said projectors, a first lever, means pivotally supporting said lever, a second lever connected to the lens and pivotally supported by said first lever, a cam follower carried by each of said levers, each cam follower being slidably engaged with one of said ball cams.

2. A lens mount for a stereoscopic photogrammetric projection instrument comprising a lens barrel, a lens barrel support, a lens carrier slidably mounted for axial displacement in said barrel, two ball cams, means for rotatably supporting said ball cams relative to said barrel and support, a member universally connected to and depending from said lens barrel support, a rocker arm pivoted to said member, rods, each rod being connected at one end to one of said ball cams and pivotally connected at the other end to the rocker arm to move said cams relative to the projection axis of the lens, cam followers slidably engaging said ball cams, a first lever having one end pivoted to the lens barrel support and carrying one of the cam followers in its other end, a second lever pivotally engaging the first lever at one end and supporting the other cam follower at its other end, and means for transmitting motion of the second lever to the lens carrier, whereby the lens carrier is moved in said barrel along its optical axis.

3. A lens mount for a stereoscopic photogrammetric projection instrument comprising a lens barrel, a lens barrel support, a lens carrier slidably mounted for axial displacement in said barrel, two ball cams, means for rotatably supporting said ball cams relative to said barrel and support, a member universally connected to and depending from said lens barrel support, a rocker arm pivoted to said member, rods, each rod being connected at one end to one of said ball cams and pivotally connected at the other end to the rocker arm to move said cams relative to the projection axis of the lens, cam followers slidably engaging said ball cams, a first lever having one end pivoted to the lens barrel support and carrying one of the cam followers in its other end, a second lever pivotally engaging the first lever at one end and supporting the other cam follower at its other end, and means for transmitting motion of the second lever to the lens carrier whereby the lens carrier is moved in said barrel along its optical axis, and means for changing the distance between the cam follower and the pivot point of the first lever to change the mechanical advantage of the first lever relative to its cam ball.

4. A lens mount for a stereoscopic photogrammetric projection instrument comprising a lens barrel, a lens barrel support, a lens carrier slidably mounted for axial displacement in said barrel, two ball cams, means for rotatably supporting said ball cams relative to said barrel and support, a member universally connected to and depending from said lens barrel support, a rocker arm pivoted to said member, rods, each rod being connected at one end to one of said ball cams and pivotally connected at the other end to the rocker arm to move said cams relative to the projection axis of the lens, cam followers slidably engaging said ball cams, a bracket carried by the lens barrel support, a first lever having one end pivoted to said bracket and carrying one of the cam followers at its other end, means for laterally shifting the position of the bracket on the support and the pivot point between the bracket and lever to vary their respective distances from the cam follower carried by the lever, the second lever pivotally engaging the first lever at one end and supporting the other cam follower at its other end, and means for transmitting motion of the second lever to the lens carrier, whereby the lens carrier is moved in said barrel along its optical axis.

5. A lens mount as defined by claim 4 in which the lens barrel support is provided with a series of recesses each representing a point of attachment for the said bracket and means for selectively securing the said bracket in one of the recesses, said first lever having a corresponding series of pivotal elements for connection to the bracket.

6. A lens mount for a stereoscopic photogrammetric projection instrument comprising a lens barrel, a lens barrel support, a lens carrier slidably mounted for axial displacement in said barrel, two ball cams, means for rotatably supporting said ball cams relative to said barrel and support, a member universally connected to and depending from said lens barrel support, a rocker arm pivoted to said member, rods, each rod being connected at one end to one of said ball cams and pivotally connected at the other end to the rocker arm to move said cams relative to the projection axis of the lens, cam followers slidably engaging said ball cams, a first lever having one end pivoted to the lens barrel support and carrying one of the cam followers on its other end, a second lever pivotally engaging the first lever at one end and supporting the other cam follower at its other end, fingers secured to and projecting outwardly from the lens carrier, and means for holding the fingers in contact with the second lever, whereby the lens carrier is moved in said barrel along its optical axis.

7. A lens mount as defined by claim 2 in which one of the rods comprises a pair of telescopical members and resilient means adjustably urging said members to a contracted position.

8. A lens mount as defined by claim 2 and means for changing the relative positions of said ball cams and said rocker arms.

References Cited in the file of this patent

UNITED STATES PATENTS

| | | |
|---|---|---|
| 1,651,648 | Von Gruber | Dec. 6, 1927 |
| 1,655,306 | Barr et al. | Jan. 3, 1928 |
| 2,085,498 | Horner | June 29, 1937 |
| 2,451,031 | Kelsh | Oct. 12, 1948 |
| 2,492,870 | Kelsh | Dec. 27, 1949 |
| 2,552,975 | Kelsh | May 15, 1951 |
| 2,678,583 | Kanapik | May 18, 1954 |